United States Patent [19]

Batiuk et al.

[11] 3,941,859
[45] Mar. 2, 1976

[54] THERMOPLASTIC POLYMER BLENDS OF EPDM POLYMER, POLYETHYLENE AND ETHYLENE-VINYL ACETATE COPOLYMER

[75] Inventors: Martin Batiuk, Grafton; Richard M. Herman, Elyria; James C. Healy, Avon, all of Ohio

[73] Assignee: The B. F. Goodrich Company, Akron, Ohio

[22] Filed: Aug. 2, 1974

[21] Appl. No.: 494,029

[52] U.S. Cl.... 260/897 B; 260/23.5 A; 260/28.5 A; 260/28.5 AV; 260/42.47; 260/42.52; 260/848; 260/897 A
[51] Int. Cl.² .......................................... C08L 23/16
[58] Field of Search ..................................... 260/897

[56] References Cited
UNITED STATES PATENTS

| | | | |
|---|---|---|---|
| 3,361,850 | 1/1968 | Young | 260/897 |
| 3,549,727 | 12/1970 | Coates et al. | 260/897 |
| 3,758,643 | 9/1973 | Fischer | 260/897 A |
| 3,806,558 | 4/1974 | Fischer | 260/897 |
| 3,821,333 | 6/1974 | Goodwin et al. | 260/897 B |

Primary Examiner—Carman J. Seccuro
Attorney, Agent, or Firm—Alan A. Csontos

[57] ABSTRACT

EPDM polymers having a high degree of unstretched crystallinity are physically blended with polyethylene and an ethylene-vinyl acetate copolymer to form thermoplastic polymer blends. The blends exhibit superior tensile strength, better than that predicted from the individual effects of the polymeric components alone. No curing or crosslinking agents are used. The thermoplastic blends are useful to prepare liners, tubing, molded products, and the like.

8 Claims, No Drawings

THERMOPLASTIC POLYMER BLENDS OF EPDM POLYMER, POLYETHYLENE AND ETHYLENE-VINYL ACETATE COPOLYMER

BACKGROUND OF THE INVENTION

Polymer blends of ethylene-propylene copolymer or ethylene-propylene-diene terpolymer with poly α-olefins, particularly polyethylene and polypropylene, are known to the art (See U.S. Pat. Nos. 3,361,850; 3,176,052; 3,220,966; 3,751,521; 3,328,486; 3,793,283; 3,262,992; 3,036,987; and 3,536,653). At times, curing or crosslinking agents are added to alter the physical nature of the blend; i.e. to effect chemical changes in the blend (See U.S. Pat. Nos. 3,758,643; 3,806,558; 3,564,080; and 3,256,366). Polymer blends of poly α-olefins or of ethylene-propylene or ethylene-propylene-diene polymers with ethylene-vinyl acetate copolymers are also known (See U.S. Pat. Nos. 3,808,047; 3,422,055; 3,361,852; and 3,549,727). The use of curing or crosslinking agents in these blends is disclosed in U.S. Pat. Nos. 3,399,250; 3,789,085; and 3,784,668. None of the above cited art discloses a three-part blend of ethylene-propylene-diene polymer, polyethylene, and ethylene-vinyl acetate copolymer wherein the blend, without the use of curing or crosslinking agents, exhibits unexpectedly high tensile strength.

SUMMARY OF THE INVENTION

Thermoplastic polymer blends comprising an ethylene-propylene-diene (EPDM) polymer having a high unstretched crystallinity of at least about 10 percent by weight of the polymer a polyethylene (PE) polymer, and an ethylene-vinyl acetate (EVA) copolymer are prepared by physically mixing under heat and shear conditions the three polymer components. The blends exhibit tensile strengths greater than that predicted from the individual effects of the polymers. No curing or crosslinking agents are used to obtain the superior tensile strengths.

DETAILED DESCRIPTION OF THE INVENTION

The thermoplastic polymer blend of this invention comprises a physical mixture of three essential polymeric components; i.e. an ethylene-propylene-diene polymer (EPDM), a polyethylene polymer (PE), and an ethylene-vinyl acetate copolymer (EVA). The blend comprises 100 parts by weight of EPDM, from about 5 parts to about 400 parts by weight of PE, and about 5 parts to about 300 parts by weight of EVA. More preferredly, the EPDM is present in 100 parts by weight, the PE is about 10 parts to about 200 parts by weight, and the EVA in about 10 parts to about 150 parts by weight.

The ethylene-propylene-diene polymers (EPDM) employed have high unstretched crystallinity, ranging from a minimum of about 10% by weight to about 20% by weight based upon the weight of the polymer. More preferredly, the unstretched crystallinity ranges from about 12% to about 16% by weight of the polymer. The unstretched crystallinity of the EPDM polymer is measured using an x-ray technique. Measuring weight percent crystallinity in polymers via x-ray is a known technique (see Natta et al, Atti Accad-Nazi. Lincei. Rend. (8) 8 11 (1957)). The method used herein consisted of pressing a 0.020 inch thick film of the EPDM polymer at 120°C and 20,000 pounds pressure. The films were quickly cooled (quenched). The thin films are then mounted and exposed to x-rays, and a defraction scan is made across an angular range. Using a diffractometer, a plot of the angular distribution of the radiation scattered by the film is made. This plot is seen as a diffraction pattern of sharp crystalline peaks superimposed upon an amorphous peak. The quantitative value of weight precent crystallinity is obtained by dividing the crystalline diffraction area of the plot by the total diffraction area on the plot.

The EPDM polymers also exhibit a large melt endotherm of from about 6 to about 10 calories/gram. The melt endotherm is measured using a Differential Scanning Calorimeter (DSC) sold by DuPont as the DuPont 900 Thermal Analyzer. The test measures orientation within the polymer. A completely amorphous EPDM terpolymer would have a zero melt endotherm. The test consists of placing a polymer sample of known weight into a closed aluminum pan. DSC Cell calorimeter pans supplied by DuPont were used. The polymer sample is then heated at a rate of 10°C/minute over a temperature range of from −100°C to +75°C. The reference material used is glass beads. The DSC chart is precalibrated, using metals with known heats of fusion, to provide a chart having a unit area in terms of calories/square inch/minute. As the polymer sample is heated, a crystalline melt point peak will show on the chart. The area under the crystalline melt point peak is measured, and the melt endotherm in calories/gram is calculated from the area obtained.

The EPDM polymer is comprised of interpolymerized units of ethylene, propylene and diene monomers. The ethylene forms from about 65% to about 85% by weight of the polymer, the propylene from about 5% to about 35% by weight, and the diene from about 0.2% to about 10% by weight, all based upon the total weight of the EPDM polymer. More preferredly, the ethylene content is from about 70% to about 80% by weight, the propylene content is from about 15% to about 29% by weight, and the diene content is from about 1% to about 5% by weight of the EPDM polymer. Examples of the diene monomers are: conjugated dienes such as isoprene, butadiene, chloroprene, and the like; and nonconjugated dienes, containing from 5 to about 25 carbon atoms, such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methylbicyclo(4,2,1)nona-3,7-diene, 3-ethyl-bicyclonondiene, and the like; indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo$(5,2,1,0^{2,6})$-3,8-decadiene, and the like. The more preferred dienes are the nonconjugated dienes. Particularly good results are obtained when alkenyl norbornenes are used as the diene monomer.

The presence of interpolymerized diene monomer in the EPDM polymer is a necessary feature of the EPDM polymer. It was found that blends of EP(ethylene-propylene) polymers with polyethylene polymers did not exhibit the unexpectedly high tensile strengths which characterize the blends of the invention. The type of diene monomer used is not critical as long as the EPDM polymer employed has high unstretched crystallinity.

The EPDM polymers are readily prepared using suspension and solution polymerization processes and techniques well known to the art.

The EPDM polymers are high molecular weight, solid elastomers. They have a dilute solution viscosity (DSV) of about 1.6 to about 2.5 measured at 25°C as a solution of 0.2 gram of EPDM polymer per deciliter of toluene. The raw polymer has a green strength tensile of about 800 psi to about 1800 psi, and more typically, from about 1000 psi to about 1600 psi, and an elongation at break of at least about 600 percent.

The polyethylene employed in the blend can be a low (to about 0.94 grams/cc.) density, medium (about 0.94 grams/cc. to about 0.96 grams/cc.) density, or high (above about 0.96 grams/cc.) density polyethylene. The low density polyethylenes are more preferred as they provide actual tensile reinforcement between the polymers. The polyethylenes, have a melt index of from about 0.2 grams/10 minutes to about 30 grams/10 minutes measured at 190°C under a 2.16 kilogram load. If a low density polyethylene is used, the melt index is preferredly below 7 grams/10 minutes. The polyethylenes are commercially available, and can readily be prepared using standard solution polymerization techniques known to the art. As mentioned before, the polyethylene is used at from about 5 parts to about 400 parts by weight with 100 parts by weight of the EPDM polymer. Particularly good results are obtained when the PE is used at about 10 parts to about 200 parts by weight with 100 parts by weight of EPDM polymer.

The ethylene-vinyl acetate copolymers employed in the polymer blend have a melt index of from about 0.4 gram/10 minutes to about 30 grams/10 minutes measured at 190°C under a 2.16 kilogram load. More preferredly, the melt index is from about 1 gram/10 minutes to about 10 grams/10 minutes. The copolymer contains interpolymerized units of from about 50% to about 90% by weight ethylene and about 10% to about 50% by weight of vinyl acetate, based on the total weight of the copolymer. A more preferred range is from about 70% to about 85% by weight ethylene and about 15% to about 30% by weight of vinyl acetate. As mentioned above, the EVA copolymer is used at 5 parts to about 300 parts by weight with 100 parts by weight of the EPDM polymer. Particularly good results are obtained using the EVA at from about 10 parts to about 150 parts by weight with 100 parts by weight of the EPDM polymer.

The composition of the invention comprises a physical blend of EPDM polymer, polyethylene polymer, and an ethylene-vinyl acetate copolymer. No cure or crosslinking agents are employed. It was totally unexpected that the thermoplastic polymer blend of the three polymeric components would exhibit a tensile strength greater than that predicted from the individual effects of any one component alone. It was further unexpected that the use of low density PE and EVA with the highly crystalline EPDM would yield blends having higher tensile strengths in the blend than the tensile strength of any one polymer alone.

The polymer blends are truly thermoplastic, moldable and remoldable at temperatures of above 120°C, preferably at above 140°C to about 200°C, yet having a strong, flexible plastic nature at room temperatures.

A wide range of rubber and plastic compounding ingredients are readily mixed with the thermoplastic polymer blends using mixing equipment such as two-roll mills, extruders, banbury mixers, and the like. Standard mixing and addition techniques are used. In many cases, the addition of compounding ingredients, particularly waxes, plasticizers and extenders, can detract from the overall tensile strength of the thermoplastic blend. Reinforcing fillers such as fumed silicas provide increased tensile strength to the blends.

Examples of compounding ingredients are metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin, and the like; antioxidants, antiozonants, and stabilizers such as di-β-naphthyl-p-phenylenediamine, phenyl-β-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethyl-phenol, 4,4'-butylidenebis-(6-t-butyl-m-cresol), 2-(4-hydroxy-3,5-t-butylaniline)-4,6-bis(octylthio)-1,3,5-triazine,hexahydro-1,3,5-tris-β-(3,5-di-t-butyl-4-hydroxyphenyl) propionyl-s-triazine, tris-(3,5-di-t-butyl-4-hydroxybenzyl) isocyanurate, tetrakismethylene-3-(3',5'-di-t-butyl-4'-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, liners, wire and cable insulation, mats, and molded items such as shoe soles, toys, kitchen ware, and the like.

The polymers used and the thermoplastic blends were evaluated for their stress-strain properties; i.e. tensile, modulus, and elongation, following ASTM procedure D638 (using a pull rate of 20 inches/minute). Hardness was measured following ASTM D2240.

The following examples are presented to further illustrate the invention. Unless otherwise stated, the ingredients recited in the recipes are used in parts by weight.

EXAMPLES

The polymeric components of the blends, along with compounding ingredients, if used, were mixed together using a two-roll mill. The roll ratio was 1.2 to 1 and the front roll has a roll speed of 21 rpm. Front roll temperature was 150°C with the back roll slightly cooler. The EPDM was banded on the mill and the other polymeric and compounding ingredients (if used) added to the banded polymer. Mill time was about 5 minutes in all cases.

The mixing conditions and temperatures outlined above are not critical. The important factor is to get uniform dispersion of the polymers and ingredients in the thermoplastic blend. This can be accomplished using other equipment, such as a banbury mixer, by mixing at other temperatures and for other times, and the like; all of which conditions and procedures are well known to the artisan. The above conditions were used to achieve good, thorough mixing, and are outlined to illustrate the preparation of the physical blends.

EXAMPLE I

An EPDM polymer (EPDM-1) having a high unstretched crystallinity was blended with a low density PE and an ethylene-vinyl acetate (EVA) copolymer. The blend was evaluated for its tensile and elongation following ASTM D-746. For comparative purposes, three other EPDM polymers having a low unstretched crystallinity were individually blended with the same PE and ethylene-vinyl acetate copolymer, and the blends evaluated. The polymeric components are identified in the following table:

| Polymer | Density (g/cc) | Weight % Crystallinity | Melt Endotherm Calories gm | Weight % Monomers | | | Vinyl Acetate | Melt Index (g/10 min) |
|---|---|---|---|---|---|---|---|---|
| | | | | Ethylene | Propylene | Diene[c] | | |
| EPDM-1 | 0.86 | 12.9 | 8.4 | 73 | 23 | 4 | — | — |
| EPDM-2 | — | 3.8 | 1.7 | 69 | 23 | 8 | — | — |
| EPDM-3 | — | 2.7 | 3.8 | 69 | 23 | 8 | — | — |
| EPDM-4 | — | 4.1 | 2.2 | 65 | 31 | 4 | — | — |
| PE-NA301[a] | 0.92 | — | — | 100 | — | — | — | 1.28 |
| EVA-UE360[b] | 0.94 | — | — | 82 | — | — | 18 | 1.5 |

[a]Sold by USI Chemicals as USI NA 301 PE
[b]Sold by USI Chemicals as USI UE 630 EVA
[c]Diene used is 5-ethylidene-2-norbornene The polymers were mixed on a two-roll mill at a mill temperature of 150°C. All of the sample compositions formed good bands on the mill. The compositions were sheeted off of the mill and pressed at 177°C in a tensile sheet mold prior to cutting the tensile test samples. The compositions were prepared according to the following recipes. Tensile samples were pulled at a rate of 20 inches/minute. Control samples of the polymers alone were also tested for their tensile strength and elongation.

| | Tensile Strength of Polymer | Elongation of Polymer | Blends | | | |
|---|---|---|---|---|---|---|
| | | | 1 | 2 | 3 | 4 |
| EPDM-1 | 1200[a] | 800[a] | 100 | — | — | — |
| EPDM-2 | 1025[a] | 280[a] | — | 100 | — | — |
| EPDM-3 | 500[a] | 1000[a] | — | — | 100 | — |
| EPDM-4 | 200[a] | 1000[a] | — | — | — | 100 |
| PE-NA301 | 2090 | 650 | 33 | 33 | 33 | 33 |
| EVA-UE630 | 2100 | 700 | 33 | 33 | 33 | 33 |
| Blend | | | | | | |
| Tensile strength, psi | | | 2460 | 1790 | 1490 | 640 |
| Elongation, percent | | | 720 | 550 | 900 | 770 |

[a]Averaged data

The data shows that EPDM-1 is unique in its ability to prepare thermoplastic blends having exceptional tensile strength. The measured tensile strength of Sample I, a composition of the present invention, is unexpectedly higher than that of any of the other blends, and is actually higher than the tensile strength of any one of the polymer components employed. No curatives or curing agents are employed in the blends.

EXAMPLE II

The experiments in Example I were repeated using still more types of EPDM polymers. The following table presents the data obtained, which data again shows the unique property of the highly crystalline EPDM polymers to prepare thermoplastic blends of high tensile strength.

| | Melt Endotherm (calories/gm) | Weight % Monomers | | |
|---|---|---|---|---|
| | | Ethylene | Propylene | Diene[a] |
| EPDM-1 | 8.4 | 73 | 23 | 4 |
| EPDM-5 | 0.3 | 69 | 23 | 8 |
| EP-6 | 4.8 | 68 | 32 | 0 |
| EP-7 | — | 75 | 25 | 0 |
| EPDM-8 | — | 58 | 38 | 4 |
| EP-9 | None | 50 | 50 | 0 |

[a]Diene used is 5-ethylidene-2-norbornene

| | Tensile Strength of Polymer | Elongation of Polymer | Blends | | | | | |
|---|---|---|---|---|---|---|---|---|
| | | | 1 | 2 | 3 | 4 | 5 | 6 |
| EPDM-1 | 1200[a] | 800[a] | 100 | — | — | — | — | — |
| EPDM-5 | 900[a] | 720[a] | — | 100 | — | — | — | — |
| EP-6 | 700[a] | 500[a] | — | — | 100 | — | — | — |
| EP-7 | 430 | 780 | — | — | — | 100 | — | — |
| EPDM-8 | 50[a] | 500[a] | — | — | — | — | 100 | — |

|         | Tensile Strength of Polymer | Elongation of Polymer | \-continued Blends |       |       |       |       |       |
| ------- | --------------------------- | --------------------- | ------------------ | ----- | ----- | ----- | ----- | ----- |
|         |                             |                       | 1                  | 2     | 3     | 4     | 5     | 6     |
| EP-9    | 25"                         | 500"                  | —                  | —     | —     | —     | —     | 100   |
| PE-NA301 | 2090                       | 650                   | 33                 | 33    | 33    | 33    | 33    | 33    |
| EVA-UE630 | 2100                      | 700                   | 33                 | 33    | 33    | 33    | 33    | 33    |
| Blend   |                             |                       |                    |       |       |       |       |       |
| Tensile Strength, psi |               |                       | 2460               | 1710  | 810   | 810   | 360   | 250   |
| Elongation, percent |                 |                       | 720                | 770   | 680   | 710   | 730   | 510   |

"Averaged data

EXAMPLE III

The highly crystalline EPDM polymer was mixed with three types of ethylene-vinyl acetate copolymer and PE polymer. All of the blends showed excellent tensile strengths, demonstrating that the thermoplastic polymer blends can be prepared using a wide range of ethylene-vinyl acetate copolymers.

|                    | 1    | 2    | 3    |
| ------------------ | ---- | ---- | ---- |
| EPDM-1             | 100  | 100  | 100  |
| PE-NA301           | 20   | 20   | 20   |
| EVA-UE630"         | 20   | —    | —    |
| EVA-UE634$^b$      | —    | 20   | —    |
| EVA-UE643$^c$      | —    | —    | 20   |
| Tensile Strength,psi | 2350 | 2430 | 2160 |
| Elongation, percent | 760  | 750  | 760  |

"82% ethylene/18% vinyl acetate copolymer having a melt index of 1.5 g/10 min. at 190°C and a tensile strength of 2100 psi
$^b$72% ethylene/28% vinyl acetate copolymer having a melt index of 3.0 g/10 min. at 190°C and a tensile strength of about 1750 psi
$^c$81% ethylene/19% vinyl acetate copolymer having a melt index of 9.0 g/10 min. at 190°C and a tensile strength of about 1600 psi

EXAMPLE IV

A highly crystalline EPDM polymer was mixed with a number of different types of polyethylene (PE) polymers and and EVA copolymer. All of the thermoplastic blends exhibited excellent tensile strengths. The polymers used are identified as follows:

|           | Density (g/cc) | Melt Index (g/10 min) | Tensile Strength (psi) | Elongation (percent) |
| --------- | -------------- | --------------------- | ---------------------- | -------------------- |
| EPDM      | 0.86           | 0.25 at 230°C         | 1500"                  | 710"                 |
| EVA-UE630 | 0.94           | 1.5 at 190°C          | 2100                   | 700                  |
| PE-NA301  | 0.92           | 1.28 at 190°C         | 2090                   | 650                  |
| PE-DND2004 | 0.92          | 1.5 at 190°C          | 1820                   | 650                  |
| PE-C14    | 0.92           | —                     | 1800                   | 570                  |
| PE-LS630  | 0.96           | 28 at 190°C           | about 4500$^b$         | 25$^b$               |
| PE-LB733  | 0.95           | 0.23 at 190°C         | 3800                   | —                    |

"Averaged data
$^b$Measured at a rate of pull of 2 inches/minute

|                    | 1    | 2    | 3    | 4    | 5    |
| ------------------ | ---- | ---- | ---- | ---- | ---- |
| EPDM-1             | 100  | 100  | 100  | 100  | 100  |
| EVA-UE630          | 10   | 10   | 10   | 10   | 10   |
| PE-NA301           | 10   | —    | —    | —    | —    |
| PE-DND2004         | —    | 10   | —    | —    | —    |
| PE-C14             | —    | —    | 10   | —    | —    |
| PE-LS630           | —    | —    | —    | 10   | —    |
| PE-LB733           | —    | —    | —    | —    | 10   |
| Tensile,psi        | 2690 | 2760 | 2610 | 2890 | 2710 |
| Elongation, percent | 710 | 750  | 730  | 680  | 720  |

Samples, 1, 2 and 3 employ low density polyethylene (PE) polymers. The tensile strengths of the blends are above that of any polymeric component used alone. Samples 4 and 5 employ high density PE polymers. The tensile strengths of the blends are above that which would be predicted using a method whereby each polymer contributes added tensile strength to the EPDM polymer in proportion to its weight percent of the total blend. Using this method, the predicted values of Samples 4 and 5 would be (1500 + 250 + 50) = 1800 psi and (1500 + 190 + 50) = 1740 psi, respectively. As the data shows, the tensile values obtained from the blends are about 1000 psi over the predicted values.

EXAMPLE V

A wide range of parts by weight of PE polymer and parts by weight of EVA copolymer can be used with the highly crystalline EPDM polymer to prepare the unique thermoplastic blends. Blends of highly crystalline EPDM, a low density PE, and EVA polymer were prepared using procedures and techniques as described before. The thermoplastic blends were then evaluated for their tensile strength. Recipes used and data obtained are as follows:

|                    | 1    | 2    | 3    | 4    | 5    | 6    | 7    | 8    | 9    | 10   | 11   | 12   | 13   |
| ------------------ | ---- | ---- | ---- | ---- | ---- | ---- | ---- | ---- | ---- | ---- | ---- | ---- | ---- |
| EPDM"              | 100  | 100  | 100  | 100  | 100  | 100  | 100  | 100  | 100  | 100  | 100  | 100  | 100  |
| PE$^b$             | 12   | 28   | 14   | 17   | 50   | 33   | 30   | 70   | 100  | 143  | 40   | 333  | 233  |
| EVA$^c$            | 12   | 14   | 28   | 50   | 17   | 33   | 70   | 30   | 100  | 43   | 143  | 233  | 333  |
| Tensile,psi        | 2390 | 2510 | 2480 | 2310 | 2540 | 2680 | 2250 | 2580 | 2480 | 2220 | 2230 | 2150 | 2260 |
| Elongation, percent | 730 | 740  | 760  | 770  | 750  | 770  | 750  | 790  | 760  | 740  | 750  | 710  | 740  |

"75% ethylene/23% propylene/4% 5-ethylidene-2-norbornene terpolymer having a tensile strength of 1460 psi and an elongation of 680 percent
$^b$Polyethylene polymer having a density of 0.92 g/cc, a melt index at 190°C of 1.28 g/10 min., and a tensile strength of 2090 psi and an elongation of 650 percent
$^c$82% ethylene/18% vinyl acetate copolymer having a tensile strength of 2100 psi, an elongation of 700 percent and melt index of 1.5 g/10 minutes at 190°C

EXAMPLE VI

This example continues the showing of Example V wherein a broad weight range of PE and EVA polymers was used with the EPDM polymer. Herein, data is presented showing thermoplastic polymer blends having high weight levels of PE polymer to low weight levels of EVA copolymer, and vice versa. High levels of PE polymer to low levels of EVA copolymer in the blend yields excellent results. However, the data shows that the use of over about 200 parts by weight of PE polymer per 100 parts EPDM polymer and 10 parts EVA copolymer is not necessary to obtain the benefits of the present invention. In contrast, the use of high levels of EVA copolymer to low levels of PE polymer detracts from the tensile strength of the blend. The use of over about 200 parts by weight of EVA copolymer per 100 parts EPDM polymer and 10 parts PE polymer is not preferred when maximum tensile strength of the blend is desired.

linity of from about 10 percent to about 20 percent by weight of the polymer and a melt endotherm value of about 6 to about 10 calories per gram, (2) from about 5 parts to about 400 parts by weight per 100 parts by weight of the EPDM polymer of a polyethylene polymer, and (3) from about 5 parts to about 300 parts by weight per 100 parts by weight of the EPDM polymer, of an ethylene-vinyl acetate copolymer.

2. A thermoplastic polymer blend of claim 1 wherein the EPDM polymer consists essentially of interpolymerized units of from about 70 percent to about 80 percent by weight of ethylene, about 15 percent to about 29 percent by weight of propylene, and about 1 percent to about 5 percent by weight of a nonconju-

|  | 1 | 2 | 3 | 4 | 5 | 6 | 7 | 8 | 9 |
|---|---|---|---|---|---|---|---|---|---|
| EPDM[a] | 100 | 100 | 100 | 100 | 100 | 100 | 100 | 100 | 100 |
| PE[b] | 350 | 250 | 150 | 50 | 10 | 10 | 10 | 10 | 10 |
| EVA[a] | 10 | 10 | 10 | 10 | 10 | 50 | 150 | 250 | 350 |
| Tensile,psi | 2140 | 2160 | 2370 | 2380 | 1760 | 2270 | 2070 | 1900 | 1750 |
| Elongation, percent | 690 | 680 | 730 | 710 | 730 | 760 | 760 | 730 | 690 |

[a]Same EPDM and EVA polymers used in Example V
[b]Polyethylene polymer having a density of 0.92 g/cc, an elongation of 570 percent, and a tensile strength of 1800 psi

EXAMPLE VII

The previous examples show that a broad range of different types of PE polymer and EVA copolymer can be mixed with a highly crystalline EPDM polymer to obtain thermoplastic polymer blends having unexpectedly superior tensile properties. Many standard rubber and plastic compounding ingredients can be admixed with the thermoplastic blends to yield attractive and functional molded items. These ingredients include particularly antioxidants and stabilizers, fillers and reinforcing agents and plasticizers and lubricants. It has been found, though, that the addition of lubricants can detract from the final tensile strength of the thermoplastic blend. The following data shows tensile strengths of blends having a filler and a lubricant used therein.

|  | 1 | 2 | 3 |
|---|---|---|---|
| EPDM-1 | 100 | 100 | 100 |
| PE-NA301 | 50 | — | — |
| PE-DND2004 | — | 20 | 20 |
| EVA-UE630 | 25 | 20 | 20 |
| HiSil/233[a] | 50 | — | — |
| Aristowax[b] | — | — | 1 |
| Tensile,psi | 2420 | 2390 | 2030 |
| Elongation, percent | 590 | 700 | 680 |

[a]Precipitated hydrated silica
[b]Process lubricant, paraffinic wax having a melting point of 165°F

We claim:

1. A thermoplastic polymer blend comprising (1) an EPDM polymer consisting essentially of interpolymerized units of about 65 percent to about 85 percent by weight of ethylene, about 5 percent to about 35 percent by weight of propylene, and about 0.2 percent to about 10 percent by weight of a diene monomer; said EPDM polymer having a weight percent unstretched crystalgated diene monomer containing from 5 to about 25 carbon atoms in the monomer.

3. A thermoplastic polymer blend of claim 2 wherein the polyethylene polymer is present in from about 10 parts to about 200 parts by weight and the ethylene vinyl acetate copolymer is present in from about 10 parts to about 150 parts by weight, both based on 100 parts by weight of the EPDM polymer.

4. A thermoplastic polymer blend of claim 3 wherein the ethylene-vinyl acetate copolymer consists essentially of interpolymerized units of from about 70 percent to about 85 percent by weight of ethylene and about 15 percent to about 30 percent by weight of vinyl acetate, and the melt index of the copolymer is from about 1 gram/10 minutes to about 10 grams/10 minutes at 190°C.

5. A thermoplastic polymer blend of claim 4 wherein the polyethylene polymer is a low density polyethylene polymer having a density of below about 0.94 grams/cc.

6. A thermoplastic polymer blend of claim 5 wherein the nonconjugated diene monomer in the EPDM polymer is an alkenyl norbornene.

7. A thermoplastic polymer blend of claim 6 wherein the EPDM polymer consists essentially of interpolymerized units of ethylene, propylene, and 5-ethylidene-2-norbornene monomer and the polyethylene polymer has a density of about 0.92 grams/cc.

8. A thermoplastic polymer blend of claim 7 comprising (1) 100 parts by weight of an EPDM polymer consisting essentially of interpolymerized units of about 73 percent by weight of ethylene, about 23 percent by weight of propylene, and about 4 percent by weight of 5- ethylidene-2-norbornene, (2) 10 parts by weight of an ethylene-vinyl acetate copolymer, and (3) 10 parts by weight of a low density polyethylene polymer.

* * * * *